(12) United States Patent
Hirsch et al.

(10) Patent No.: US 8,819,098 B2
(45) Date of Patent: Aug. 26, 2014

(54) COMPUTATION OF A REMAINDER BY DIVISION USING PSEUDO-REMAINDERS

(75) Inventors: Michael Hirsch, Mazkeret Batya (IL); Shmuel T. Klein, Rehovot (IL); Yair Toaff, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 12/953,161

(22) Filed: Nov. 23, 2010

(65) Prior Publication Data

US 2012/0131082 A1    May 24, 2012

(51) Int. Cl.
*G06F 7/38* (2006.01)
(52) U.S. Cl.
USPC .......................................................... 708/491
(58) Field of Classification Search
CPC ............ G06F 7/72; G06F 7/727; G06F 7/728
USPC .................. 708/491, 650, 653, 655
See application file for complete search history.

(56) References Cited

U.S. PATENT DOCUMENTS

| 5,301,139 | A | 4/1994 | Zinger | |
|---|---|---|---|---|
| 5,689,721 | A | 11/1997 | Maher, III | |
| 5,710,730 | A | 1/1998 | Smith, Sr. | |
| 5,724,279 | A * | 3/1998 | Benaloh et al. | 708/491 |
| 5,748,518 | A | 5/1998 | Jaggar | |
| 7,149,767 | B2 | 12/2006 | Busaba et al. | |
| 7,185,041 | B1 | 2/2007 | End, III | |
| 2004/0083251 | A1 | 4/2004 | Geiringer et al. | |
| 2004/0098435 | A1* | 5/2004 | Moore | 708/491 |
| 2006/0129623 | A1 | 6/2006 | Uesugi | |
| 2009/0132628 | A1 | 5/2009 | Carlough et al. | |
| 2010/0146028 | A1* | 6/2010 | Lambert | 708/491 |

FOREIGN PATENT DOCUMENTS

JP    11203110 A    7/1999

* cited by examiner

Primary Examiner — Chuong D Ngo
(74) Attorney, Agent, or Firm — Griffiths & Seaton PLLC

(57) ABSTRACT

Methods, computer systems, and computer program products for calculating a remainder by division of a sequence of bytes interpreted as a first number by a second number is provided. A pseudo-remainder by division associated with a first subsequence of the sequence of bytes is calculated. A property of this pseudo-remainder is that the first subsequence of the sequence of bytes, interpreted as a third number, and the pseudo-remainder by division have the same remainder by division when divided by the second number. A second subsequence of the sequence of bytes interpreted as the first number is appended to the pseudo-remainder, interpreted as a sequence of bytes, so as to create a sequence of bytes interpreted as a fourth number. The first number and the fourth number have the same remainder by division when divided by the second number.

21 Claims, 3 Drawing Sheets

COMPUTATION OF A REMAINDER BY DIVISION USING PSEUDO-REMAINDERS

BACKGROUND OF THE INVENTION

1. Field of the Invention

The present invention relates in general to computers, and more particularly to methods, computer systems, and computer program products for computation of a remainder by division of a sequence of bytes using pseudo-remainders.

2. Description of the Related Art

In many contexts, it is necessary to compute the remainder obtained by the division of a very large number by a smaller number that is close to a power of 2. As an example, in the case of some Rabin-Karp hash functions, it is necessary to compute the remainder obtained by the division of a 512-byte number by a constant 7-byte prime number such as $2^{55}-55$.

Most programming languages have built-in operations for calculating such remainders, the modulo operation, but this obviously works only on inputs of restricted length (typically 32, 64 or 128 bits). For much larger numbers, as those represented by an input bit string of a priori unlimited length, the operation has to be performed iteratively. For instance, the traditional iterative computation of the remainder of the division of a 512-byte number contained in an array "buf" by a smaller number P is:

$$h = 0; \text{ for } (i = 0; i < 512; i++)\{h = (h*2^8 + buf[i]) \% P;\} \text{ return } h; \quad (1)$$

This traditional computation uses 512 steps to compute the remainder. In each traditional step, a new value of the intermediate result h is computed by taking the previous value of the intermediate product, multiplying it by 256, adding the next byte from the 512-byte number, and then taking the remainder of this number when divided by P. This solution requires significant computing resources.

To reduce the number of steps, one could increase the number of bytes processed in each iteration. For example, if 4 bytes are processed in each iteration instead of 1, the procedure will become

```
h = 0;
for (i=0; i < 512; i+=4) {
   h = (h * 2^32 + buf[i]<<24 + buf[i]<<16 + buf[i]<<8 + buf[i]) % P;
}
return h;
```

Increasing the size of the basic unit to be processed to 4 bytes may produce intermediate calculations which exceed the capacity of the largest integers that can be handled efficiently.

SUMMARY OF THE DESCRIBED EMBODIMENTS

According to one aspect of the present invention, in each of the step, the actual remainder is not computed. Instead, the computation only reduces the size of the intermediate result to a size that can be handled efficiently by the processor. The intermediate result may be larger than the real remainder by a small multiple of P, but will still fit in the size that the processor can handle efficiently. This may be referred to as a "pseudo-remainder." The final result at the end of the iteration, though, is the correct remainder.

In one embodiment, a method for calculating a remainder by division of a sequence of bytes, interpreted as a first number, by a second number is provided. A pseudo-remainder by division associated with a first subsequence of the sequence of bytes is calculated. A property of the pseudo-remainder is that the first subsequence of the sequence of bytes, interpreted as a third number, and the pseudo-remainder by division have the same remainder by division when divided by the second number. A second subsequence of the sequence of bytes interpreted as the first number is appended to the pseudo-remainder, interpreted as a sequence of bytes, so as to create a sequence of bytes interpreted as a fourth number. The first number and the fourth number have the same remainder by division when divided by the second number.

Since the input of the above procedure (i.e., the first number), and the output (i.e, the fourth number) have the same remainder by division, this may be applied iteratively. Note that the subsequences may be chosen so that the fourth number has fewer bits than the first, which implies that the iterative procedure ultimately converges.

In another embodiment, a computer system is provided. The computer system includes a computer-readable medium and a processor in operable communication with the computer-readable medium. The processor is adapted to calculate a pseudo-remainder by division associated with a first subsequence of the sequence of bytes, wherein the first subsequence of the sequence of bytes interpreted as a third number and the pseudo-remainder have the same remainder by division when divided by the second number and append a second subsequence of the sequence of bytes interpreted as the first number to the pseudo-remainder interpreted as a sequence of bytes so as to create a sequence of bytes interpreted as a fourth number. The first number and the fourth number have the same remainder by division when divided by the second number.

In a further embodiment, a computer program for calculating a remainder by division of a sequence of bytes interpreted as a first number by a second number is provided. The computer-readable storage medium has computer-readable program code portions stored thereon. The computer-readable program code portions include a first executable portion and a second executable portion. The first executable portion is for calculating a pseudo-remainder by division associated with a first subsequence of the sequence of bytes, wherein the first subsequence of the sequence of bytes interpreted as a third number and the pseudo-remainder have the same remainder by division when divided by the second number. The second executable portion is for appending a second subsequence of the sequence of bytes interpreted as the first number to the pseudo-remainder interpreted as a sequence of bytes so as to create a sequence of bytes interpreted as a fourth number. The first number and the fourth number have the same remainder by division when divided by the second number.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and program product codes for calculating or evaluating remainders by division, such as Rabin-Karp hashes.

The method given below computes a remainder by division of a 512 byte number in 128 steps instead of the 512 steps required by the traditional computation. This may be performed by processing 4 bytes in each step instead of only 1 in each of the steps, as is the case with the traditional method. Increasing the size of the basic unit to be processed to 4 bytes may produce intermediate calculations which exceed the capacity of the largest integers that may be handled efficiently. However, in each of the steps, the actual remainder is not computed. Instead, the computation only reduces the size of the intermediate product to a size that can be handled efficiently by the processor. The intermediate product may be larger than the real remainder by a small multiple of P, but will still fit in the size that the processor can handle efficiently. This may be referred to as a "pseudo-remainder." The final result at the end of the iteration, though, is the correct remainder.

In one embodiment, a method for calculating a remainder by division of a sequence of bytes, interpreted as a first number, by a second number is provided. A pseudo-remainder by division associated with a first subsequence of the sequence of bytes is calculated. A property of this pseudo-remainder is that the first subsequence of the sequence of bytes, interpreted as a third number, and the pseudo-remainder by division have the same remainder by division when divided by the second number. A second subsequence of the sequence of bytes interpreted as the first number is appended to the pseudo-remainder, interpreted as a sequence of bytes, so as to create a sequence of bytes interpreted as a fourth number. The first number and the fourth number have the same remainder by division when divided by the second number.

Since the input of the above procedure (i.e., the first number), and the output (i.e., the fourth number) have the same remainder by division, this may be applied iteratively. Note that the subsequences may be chosen so that the fourth number has fewer bits than the first, which implies that the iterative procedure ultimately converges.

Figure 1:
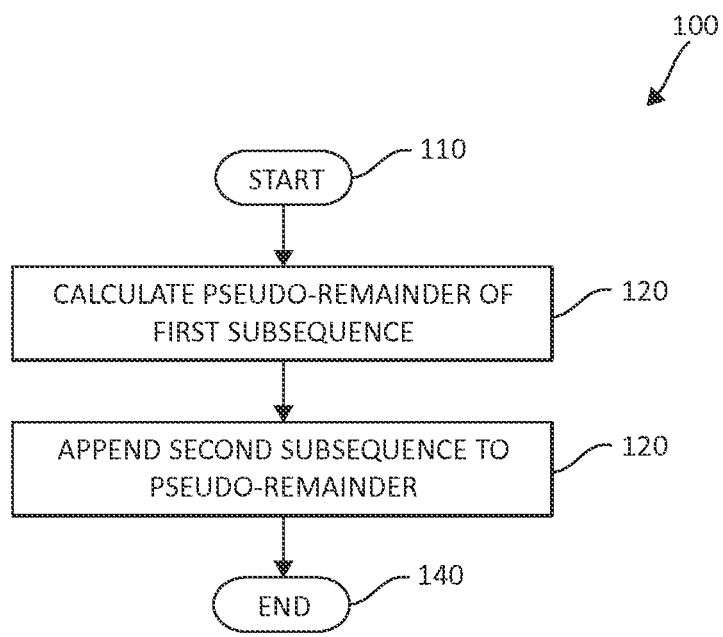
FIG. 1 is a flow chart of a method for calculating a remainder by division according to one embodiment of the present invention.

FIG. 1 illustrates a method 100 for calculating a remainder by division of a sequence of bytes interpreted as a first number by a second number. At step 102, the method begins with, for example, the initiating of the calculation of a remainder by division. At step 104, a pseudo-remainder by division associated with a first subsequence of the sequence of bytes is calculated. This first subsequence of the sequence of bytes, interpreted as a third number and the pseudo-remainder have the same remainder by division when divided by the second number. At step 106, a second subsequence of the sequence of bytes interpreted as the first number is appended to the pseudo-remainder interpreted as a sequence of bytes so as to create a sequence of bytes interpreted as a fourth number. The first number and the fourth number have the same remainder by division when divided by the second number. At step 108, the method 100 ends.

Figure 2:
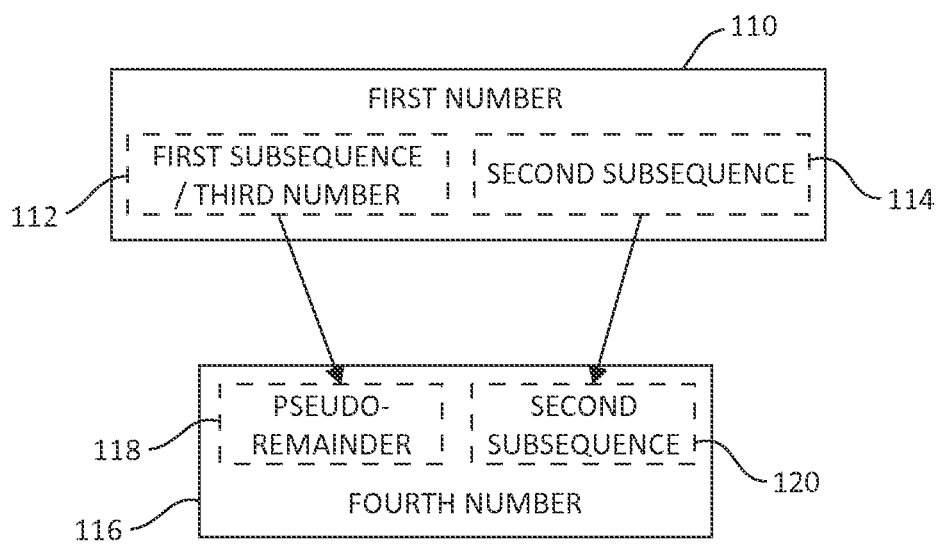
FIG. 2 is a block diagram further illustrating the method of FIG. 1.

FIG. 2 illustrates the method 100 of FIG. 1 in a block diagram form. More particularly, FIG. 2 provides graphical illustration of the relationship between the first number 110, the first subsequence of bytes (and/or the third number) 112, the second subsequence of bytes 114, the fourth number 116, and pseudo-remainder 118, and the second subsequence of bytes 120.

The method(s) depicted in FIGS. 1 and 2 will be put into context more clearly in the discussion found below. Additionally, some embodiments of the present invention may include other steps in addition to those shown in FIGS. 1 and 2.

In the case of a processor that can perform 64-bit arithmetic efficiently, the technique described herein works for any number P that can be expressed as $P=(2^k-c)$ where $k<=63$ and $c<2^n$. The value of n is given by the formula $n=(k-(8b+1))$ where b is the number of bytes processed in each iteration of the algorithm. In the case of $k=63$ and of 4 bytes processed in each iteration as given in the example below, n is 30. The example below uses $P=(2^{55}-55)$. P is a prime number, though this has no relevance on the algorithm, only on the application to calculating a Rabin-Karp hash value.

$$h = 0; \text{ for } (i = 0; i < 512; i += 4) \quad (2)$$

$$\{h = ((h >> 23)*55) + ((h \, \& \, 0 \times 7fffff) << 32) +$$

$$(buf[i+0] << 24) + (buf[i+1] << 16) +$$

$$(buf[i+2] << 8) + buf[i+3];\} \text{ return } (h \, \% \, P);$$

The binary representation of h can be considered to have two parts: a part a having the leftmost 64-23=41 bits of h and a part b having the 23 rightmost bits of h. Thus, h may be expressed as $$h=a*2^{23}+b. \quad (3)$$

h multiplied by $2^{32}$ is then given by $$h*2^{32}=a*2^{55}+b*2^{32}, \quad (4)$$

but the term $(a*2^{55})$ has a very simple remainder when divided by P $$(a*2^{55})\% \, P = (a*2^{55})\%(2^{55}-55)=a*55. \quad (5)$$

Note that the value of h right shifted 23 bits gives the value of a. The third line of the Calculation (2) above (i.e., ((h>>23) *55)) then calculates (a*55).

The fourth line of Calculation (2) above (i.e., +((h & 0x7fffff)<<32)) calculates the value of b from h by masking off all but the 23 lowest bits (h & 0x7fffff), and then multiplies the result by $2^{32}$ by shifting it 32 bits to the left.

The third and fourth lines of Calculation (2) together compute the pseudo-remainder of $(h*2^{32})$ when divided by P using Calculations (4) and (5). Since h was at most 56 bits long, and a is the bits in positions larger than 23, a is at most 33 bits long. Thus, a multiplied by 55 (i.e., a*55) is at most 39 bits long. The value of b was at most 23 bits long, and shifting it 32 bits to the left means that it becomes at most 55 bits long. Adding to this a number that is 39 bits long (and adding another 32 bit number in the fifth through eighth lines of Calculation (2)) means that the maximal new value of h is 56 bits long. This value may be larger than P, but it will always be smaller than the remainder plus P or 2*P because it cannot be larger than 56 bits. Although the intermediate step did not calculate the true remainder, it trimmed the intermediate result to a value that fits into 64 bits. Since the intermediate result is (remainder+nP) for some integral value of n, it has the same remainder when divided by P as the true remainder. It is this intermediate result that is called the pseudo-remainder in the present invention.

Finally, the tenth line of Calculation (2) (i.e., return (h % P) converts the pseudo-remainder to a true remainder. This happens once for the entire calculation immediately prior to returning the end result.

As an alternative, the tenth of Calculation (2) could be replaced by $$\text{if } (h > P)\{h = h - P; \text{if } (h > P)\{h = h - P;\}\} \quad (6)$$

In such a case, there would be no reference to the % operator at all.

Various aspects of the computations, as well as the insights which led to embodiment of the present invention, are discussed below.

$$B_1 = \sum_{j=0}^{127} A[127-j]x^j,$$

where we have set $x=2^{32}$, which in turn may be written using Horner's rule as $$B_1 = ((\ldots ((((A[0]x+A[1])x+A[2])x+A[3])x+A[4])\ldots )x+A[126])x+A[127]. \quad (13)$$

Since we are interested in $B_1$ mod P, it would suffice, mathematically speaking, to apply a single mod operation at the end of the above formula. However, in practice, such an evaluation is not feasible, because of the 4096 bit long number, which cannot be handled. The classical solution, generally used in modular exponentiation algorithms, is to exploit the properties of the modulo function, in particular, that $$\overline{x \times y} = \overline{\overline{x} \times \overline{y}} \text{ and } \overline{x+y} = \overline{\overline{x}+\overline{y}}, \quad (14)$$

where we use the shortcut $\bar{x}=x$ mod P, if P is known and constant, to repeatedly apply the modulus to subparts of the formula, so as to never let the operands on which the modulus has to be applied grow above the limit permitted by the hardware at hand. For example, the above formula would give $$\overline{B_1} = \overline{((\ldots (((\overline{(A[0]x + A[1])}x + A[2])x + A[3])x + A[4]) \ldots )x + A[126])x + A[127]}, \quad (15)$$

Consider a string $B_1$ of length 512 bytes which has been partitioned into 128 subblocks of 4 bytes each, denoted A[0], ..., A[127]. The correctness of the procedure above is based on the following.

A theorem may be proposed that the value of h is throughout smaller than $2^{56}$. That is, it fits into 56 bits, at the end of each iteration.

The theorem may be proved by induction on i, the index of iteration. For i=0, at the beginning of the iteration, h and thus also its left and right parts are 0. The value of h at the end of iteration 0 is therefore A[0], which has only 32 bits, less than 56.

Let us now take the assumption as being true at the end of iteration i, and consider the beginning of iteration i+1. The right part of h, Rh, has at most 23 bits by definition, and the left part of h, Lh, has at most 56−23=33 bits by the inductive assumption. Hence Rh*$2^{32}$ is no longer than 55 bits, as is Rh*$2^{32}$+A[i], since the 32 rightmost bits of Rh×$2^{32}$ are zero. The binary representation of 55 uses 6 bits. Thus, Lh*55 is at most 39 (i.e., 33+6) bits long. At the end of the iteration, the length of h, obtained by adding a 39 bit number to a 55 bit number, must therefore be no longer than 56 bits. This limit is achieved only if a carry propagates beyond the leftmost bit of Rh×$2^{32}$.

It follows from the theorem that there is no overflow if we remove the repeated application of the modulo operator and only perform a single (and rarely, two) modulus at the end of the iteration. This is the purpose of the last lines of Calculation (6). Since at the end, h<$2^{56}$=2P+110, the modulus may be replaced by subtraction. If P≤h<2P, then h mod P=h−P. For the rare cases in which 2P≤h<2P+110 (only 110 out of the possible almost $2^{56}$ values of h), a second subtraction of P will be necessary.

To understand how all the mod operations within the iteration may be saved, recall that our objective was to calculate $B_1$ mod P. $B_1$ itself is given by the polynomial where after each multiplication and addition, mod P is applied.

Therefore, if we begin with k bit numbers, at no stage of the evaluation do we use numbers larger than 2k bits. Such an approach has the disadvantage that such a large number of modulo applications is expensive. The method described herein reverts the process and removes again the internal modulo applications, but not entirely, since this would lead to handling 4096 bit numbers. Rather, the method described herein removes only a part of the internal operations, but leaves the cheap ones (i.e., those that do not require significant system resources), based on dealing with modulo a prime which is very close to a power of 2, namely P=$2^{55}$−55. Thus, $2^{55}$ mod P=55, an extremely small number relative to P, which may be used to decompose blocks into adjacent subblocks very efficiently.

In summary, the method described herein presents a tradeoff between applying the mod operation only once (which is cheap but unfeasible because of the size of the numbers involved), and applying it repeatedly in every iteration (resulting in small numbers, but computationally expensive). Here, it is applied only once (rarely twice) at the end, but managed by an appropriate decomposition of the numbers to remove the moduli and still force all the involved numbers to be small.

Note that this technique may not be applied generally in situations where the modulus is chosen as a large random prime number, as often done in cryptographic applications, since it depends on the fact that $2^{55}$ mod P is a small number. In the present case, it uses only 6 bits. The theorem presented above would still hold for values needing up to 22 bits, in which case Lh*($2^{55}$ mod P) is of length at most 55 (33+22) bits. The sum of two 55 bit numbers would then still fit into the 56 bits claimed in the induction.

However, for 23 bits, overflow into 57 bits may occur. If P is a random prime number of 55 bits, the expected length of ($2^{55}$ mod P) is 54 bits and will only extremely rarely fit into 22 bits. The application field of the technique is thus when repeated evaluations are needed, all modulo a constant prime P, which may therefore be chosen as some convenient prime just a bit smaller than a given power of 2. This is the case in rolling hashes of the Rabin-Karp type.

In some experimental tests, use of the method described herein approximately doubled the processing speed (i.e., in megabit per second) for some computing systems when compared to calculating a Rabin Karp hashing using the traditional method. In other computing systems, the processing speed was increased by a factor of eight.

Figure 3:
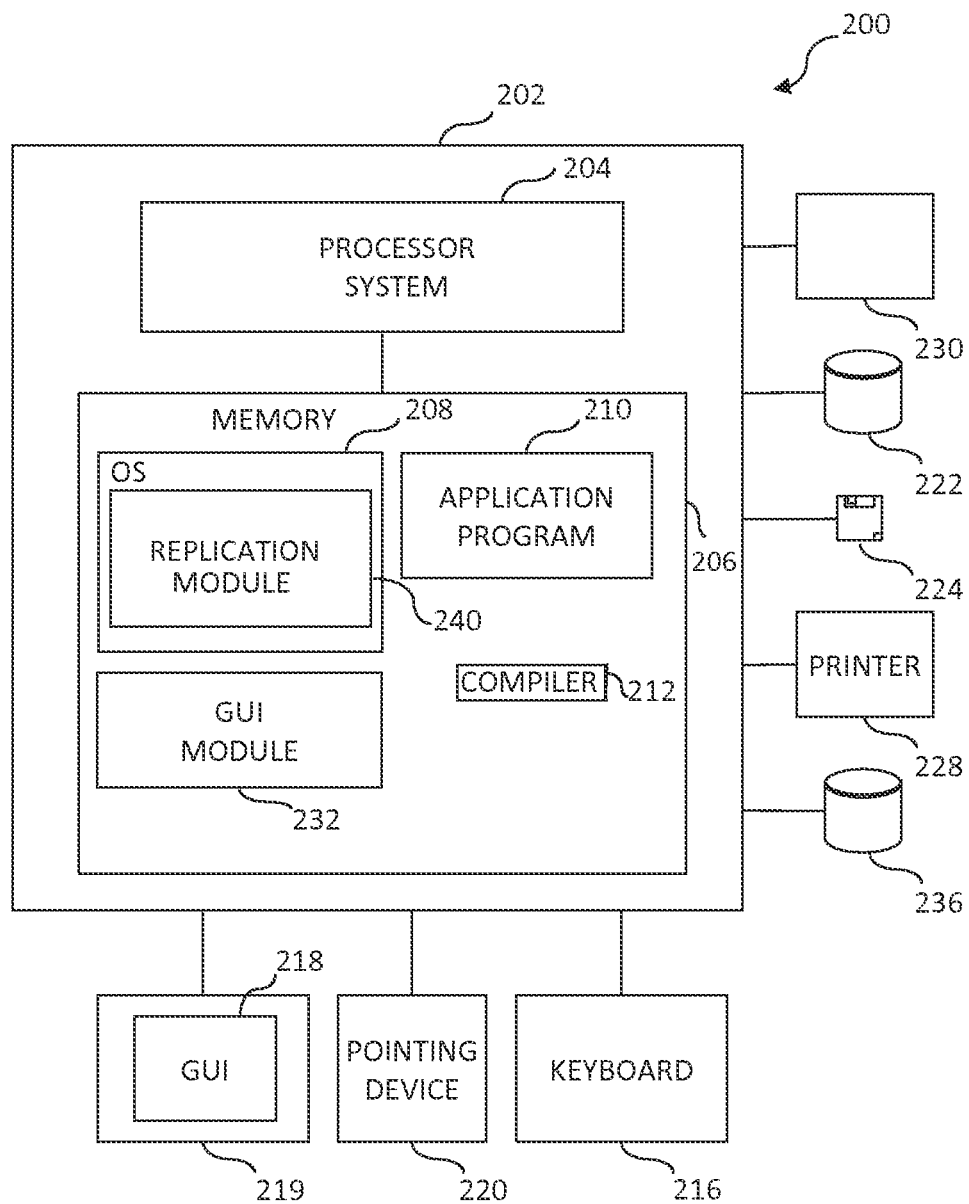
FIG. 3 is a block diagram of an exemplary computing system according to one embodiment of the present invention.

FIG. 3 illustrates an exemplary computing system 200 in which the process described above may be performed. It should be appreciated that FIG. 3 is only exemplary and is not intended to state or imply any limitation as to the particular architectures in which the exemplary aspects of the various embodiments may be implemented. Many modifications to the architecture depicted in FIG. 3 may be made without departing from the scope and spirit of the following description and claimed subject matter.

The system 200 includes a computer 202 with a processor system 204 (e.g., a processor or processor device) and a memory 206, such as random access memory (RAM). The computer 202 is operatively coupled to a display 219, which presents images such as windows to the user on a graphical user interface (GUI) 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 which may be adapted for carrying out various processes and mechanisms in the exemplary embodiments previously described. Replication module 240 may be implemented in hardware, firmware, or a combination of hardware and firmware. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 3, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As will be appreciated by one skilled in the art, aspects of the present invention employ the term "byte" and "sequence of bytes" purely for convenience. Accordingly, the present invention is equally applicable if these terms are replaced by "bit" and "sequence of bits".

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions (i.e., executable portions) for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for calculating, by a processor, a remainder by division of a sequence of bytes interpreted as a first number by a second number, the method comprising:

determining the second number, wherein the second number (P) is expressed as $P=(2^k-c)$, where k is less than a bit processing capability of the processor, and c is less than $2^n$, where n is given by the formula $n=(k-(8b+1))$, where b is the number of bytes processed by the processor in each iteration;

dividing the sequence of bytes into a first subsequence of bytes and a second subsequence of bytes;

calculating a pseudo-remainder by expressing the first subsequence of bytes $A*2^{(k-8b)}+B$, wherein the pseudo-remainder is a third number calculated as a sum of $A*k$ and $B*2^{8b}$;

combining the second subsequence of bytes and the pseudo-remainder to create a fourth number; and dividing the fourth number by P to generate the remainder, wherein the first number and the fourth number have the same remainder when divided by P.

2. The method of claim 1, wherein the second number is a prime number.

3. The method of claim 2, wherein the calculating of the pseudo-remainder by division is used for calculating a Rabin Karp hash.

4. The method of claim 1, wherein the second number is approximately a power of two.

5. The method of claim 1, further comprising repeating a plurality of iterations of the calculating of the pseudo-remainder and the combining of the second subsequence, wherein the first number used in one of the iterations is the fourth number calculated in a previous iteration.

6. The method of claim 1, wherein the first subsequence of the sequence of bytes and the second subsequence of the sequence of bytes are disjoint and cover together the entire given sequence of bytes.

7. The method of claim 6, wherein the first subsequence is the entire sequence of bytes excluding the final 4 bytes.

8. A computer system comprising:
a computer-readable medium; and
a processor in operable communication with the computer-readable medium, the processor being adapted to:
  determine the second number, wherein the second number (P) is expressed as $P=(2^k-c)$, where k is less than a bit processing capability of the processor, and c is less than $2^n$, where n is given by the formula $n=(k-(8b+1))$, where b is the number of bytes processed by the processor in each iteration;
  divide the sequence of bytes into a first subsequence of bytes and a second subsequence of bytes;
  calculate a pseudo-remainder by dividing expressing the first subsequence of bytes $A*2^{(k-8b)}+B$, wherein the pseudo-remainder is a third number calculated as a sum of $A*k$ and $B^*2^{8b}$;
  combine the second subsequence of bytes and the pseudo-remainder to create a fourth number; and
  divide the fourth number by P to generate the remainder, wherein the first number and the fourth number have the same remainder when divided by P.

9. The computer system of claim 8, wherein the second number is a prime number.

10. The computer system of claim 9, wherein the calculating of the pseudo-remainder by division is used for calculating a Rabin Karp hash.

11. The computer system of claim 8, wherein the second number is approximately a power of two.

12. The computer system of claim 8, wherein the processor is further adapted to repeat a plurality of iterations of the calculating of the pseudo-remainder and the combining of the second subsequence, wherein the first number used in one of the iterations is the fourth number calculated in a previous iteration.

13. The computer system of claim 8, wherein the first subsequence of the sequence of bytes and the second subsequence of the sequence of bytes are disjoint and cover together the entire given sequence of bytes.

14. The computer system of claim 13, wherein the first subsequence is the entire sequence of bytes excluding the final 4 bytes.

15. A non-transitory computer program product for calculating a remainder by division of a sequence of bytes interpreted as a first number by a second number, the computer program product further including computer-readable program code portions stored thereon, the computer-readable program code portions comprising:
  a first executable portion for determining the second number, wherein the second number (P) is expressed as $P=(2^k-c)$, where k is less than a bit processing capability of the processor, and c is less than $2^n$, where n is given by the formula $n=(k-(8b+1))$, where b is the number of bytes processed by the processor in each iteration;
  a second executable portion for dividing the sequence of bytes into a first subsequence of bytes and a second subsequence of bytes;
  a third executable portion for calculating a pseudo-remainder by expressing the first subsequence of bytes $A*2^{(k-8b)}+B$, wherein the pseudo-remainder is a third number calculated as a sum of $A*k$ and $B^*2^{8b}$;
  a fourth executable portion for combining the second subsequence of bytes and the pseudo-remainder to create a fourth number; and
  a fifth executable portion for dividing the fourth number by P to generate the remainder, wherein the first number and the fourth number have the same remainder by division when divided by the second number.

16. The computer program product of claim 15, wherein the second number is a prime number.

17. The computer program product of claim 16, wherein the calculating of the pseudo-remainder by division is used for calculating a Rabin Karp hash.

18. The computer program product of claim 15, wherein the second number is approximately a power of two.

19. The computer program product of claim 15, further comprising at least one additional executable portions for repeating a plurality of iterations of the calculating of the pseudo-remainder and the combining of the second subsequence, wherein the first number used in one of the iterations is the fourth number calculated in a previous iteration.

20. The computer program product of claim 15, wherein the first subsequence of the sequence of bytes and the second subsequence of the sequence of bytes are disjoint and cover together the entire given sequence of bytes.

21. The computer program product of claim 20, wherein the first subsequence is the entire sequence of bytes excluding the final 4 bytes.

* * * * *